US008265676B2

(12) United States Patent
Omar

(10) Patent No.: US 8,265,676 B2
(45) Date of Patent: Sep. 11, 2012

(54) HYBRID NETWORK RESOURCE AND POLICY MANAGEMENT WITH MOBILITY SUPPORT

(75) Inventor: Hassan M. Omar, Mt. Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1053 days.

(21) Appl. No.: 12/187,465

(22) Filed: Aug. 7, 2008

(65) Prior Publication Data

US 2010/0035643 A1 Feb. 11, 2010

(51) Int. Cl.
*H04L 12/66* (2006.01)
*H04W 4/00* (2009.01)
*H04W 36/00* (2009.01)
*G01R 31/08* (2006.01)
*H04B 7/00* (2006.01)

(52) U.S. Cl. .............. 455/509; 455/432.1; 455/433; 455/439; 370/352; 370/328; 370/329; 370/238

(58) Field of Classification Search .............. 455/509, 455/432.1, 433, 439; 370/352, 328, 329, 370/238
See application file for complete search history.

(56) References Cited

U.S. PATENT DOCUMENTS

| | | | | |
|---|---|---|---|---|
| 7,155,518 B2 * | 12/2006 | Forslow | ............... | 709/227 |
| 7,277,948 B2 * | 10/2007 | Igarashi et al. | ............... | 709/227 |
| 7,697,508 B2 * | 4/2010 | Hernandez-Mondragon et al. | ............... | 370/352 |
| 2001/0053694 A1 * | 12/2001 | Igarashi et al. | ............... | 455/433 |
| 2005/0272438 A1 * | 12/2005 | Holur et al. | ............... | 455/452.2 |
| 2006/0019708 A1 * | 1/2006 | Raman et al. | ............... | 455/561 |
| 2007/0191054 A1 * | 8/2007 | Das et al. | ............... | 455/525 |
| 2009/0190552 A1 * | 7/2009 | Balay et al. | ............... | 370/331 |
| 2010/0128696 A1 * | 5/2010 | Fantini et al. | ............... | 370/331 |
| 2010/0157947 A1 * | 6/2010 | Hernandez-Mondragon et al. | ............... | 370/331 |
| 2010/0246394 A1 * | 9/2010 | Omar | ............... | 370/230.1 |
| 2010/0296483 A1 * | 11/2010 | Sayeedi et al. | ............... | 370/331 |
| 2011/0007711 A1 * | 1/2011 | Muhanna et al. | ............... | 370/331 |

* cited by examiner

*Primary Examiner* — Bobbak Safaipour

(57) ABSTRACT

A method may include receiving a quality of service request initiated by a mobile node and requesting from a home agent a service level agreement profile for the mobile node. The method may further include allocating resources between a gateway foreign agent and the mobile node. The method may also include initiating resource allocation between the home agent and the gateway foreign agent and initiating resource allocation between a correspondent node and the home agent. The method may further include establishing resource allocation between the mobile node and the correspondent node.

21 Claims, 11 Drawing Sheets

HYBRID NETWORK RESOURCE AND POLICY MANAGEMENT WITH MOBILITY SUPPORT

BACKGROUND

Modern services and applications require different levels of treatment and guarantee for each of the involved traffic components, such as voice, video, and data. In addition, service providers are enticed to be able to support the contracted service level even if the user is on the move and/or utilizing different access technologies. Subscriber traffic may need to be transported over multiple networks that belong to different carriers and/or service providers. Supporting different levels of service for users requires coordination between providers to ensure appropriate Quality of Service (QoS) treatment for the different traffic components.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention. Instead, the scope of the invention is defined by the appended claims and their equivalents.

Implementations described herein provide an integrated system that provides resource management in an environment that supports both stationary and mobile users. The system accepts requests from an end user and manages the network in both mobile and core networks. Although implementations are described in the context of the hierarchical Mobile Internet Protocol (MIP or Mobile-IP), the systems and methods described herein are applicable to other types of environments. A hybrid approach may be used to collect, aggregate, and process QoS related requests in both mobility support and core networks. To manage resources in the mobility support environment, this hybrid approach utilizes a distributed scheme that capitalizes on the mobility network characteristics to reduce overhead associated with resource management in the highly dynamic environment. A centralized scheme may be used to accommodate resource management in the core network. The hybrid scheme utilizes both the distributed and centralized management techniques to ensure optimal performance. In addition, few mechanisms are introduced to enhance the performance of processing resource requests. In the description provided herein, aspects of the DiffServ model are considered as the QoS underlying architecture. Implementations disclosed herein can interoperate with other approaches.

Figure 1:
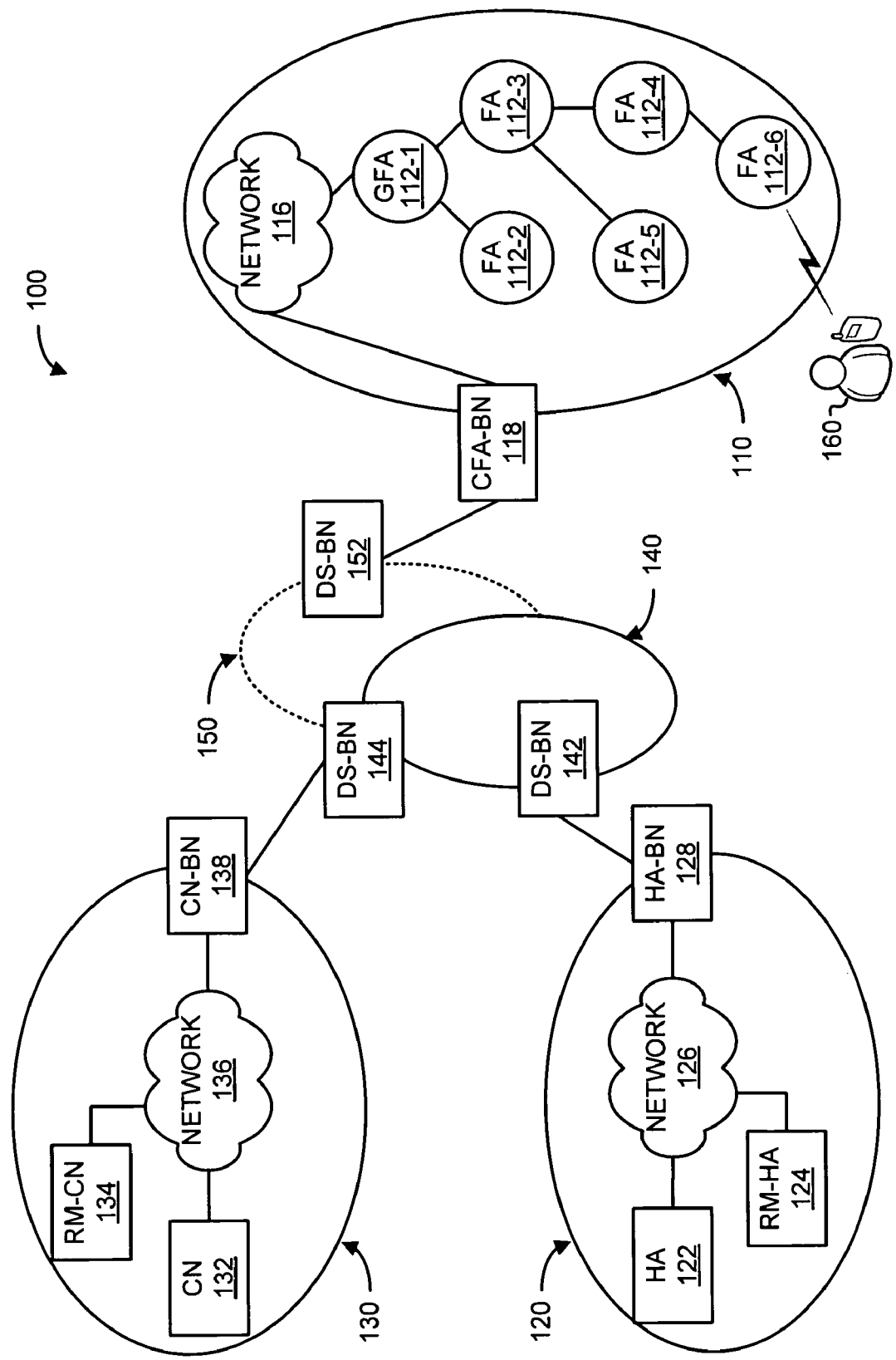
FIG. 1 illustrates an exemplary network in which systems and methods described herein may be implemented.

FIG. 1 is a block diagram of an exemplary network 100 in which systems and methods described herein may be implemented. As illustrated, network 100 may include a mobile domain 110, a home agent domain 120, a correspondent domain 130, one or more intervening core network domains 140/150 and a mobile node (MN) 160.

Mobile domain 110 may include a number of foreign agents (FAs), including a gateway foreign agent (GFA) 112-1, FA 112-2, FA 112-3, FA 112-4, FA 112-5 and FA 112-6 (collectively referred to as FAs 112, and generically as FA 112-x) that may serve as possible attachment points to a mobile node, such as MN 160. At a particular point in time, a FA 112-x may serve as the FA that is a network attachment point for a particular mobile node (referred to herein as a "current foreign agent (CFA)"). As shown in FIG. 1, FA 112-6 may serve as the CFA for MN 160. FA 112-x may include a network device such as a router, a switch, an optical cross connect (OCX), a hub, a bridge, a multiplexer, or another type of computation or communication device capable of running on any layer.

Mobile domain 110 may also include mobile network 116 to facilitate communication with a border node, such as the border node for current foreign agent CFA-BN 118. Generally, as used herein, a border node may be considered a node on the edge of a domain that communicates with another domain. In one implementation, mobile network 116 may include a cellular telephone network (e.g., wireless GSM, wireless CDMA, etc.). Network traffic may pass through one or more FAs 112, through mobile network 116, and through CFA-BN 118 before being passed to another domain, such as core network domain 150. FAs 112 that forward traffic received from upstream or downstream (e.g., FA 112-3 and FA 112-4 of FIG. 1) may be referred to as interior nodes.

At a particular point in time, another FA 112-x may serve as a GFA for mobile domain 110. As shown in FIG. 1, FA 112-1 may serve as the GFA for traffic to/from MN 160. Also, as described herein, a domain resource manager (DRM) may be co-located with GFA 112-1. While the DRM functions are described herein as located at GFA 112-1, the DRM may be located at any FA 112-x within mobile domain 110. In other implementations, some DRM functions may be located outside mobile domain 110.

Mobile domain 110 may use Mobile-Internet-Protocol (Mobile IP or MIP), an extension to IP protocol that allows mobile nodes to continue receiving datagrams wherever they happen to be attached to the Internet. Mobile IP describes additional control messages that are needed to allow involved network devices to manage their IP routing tables. Mobile IP protocol (as described in Internet Engineering Task Force (IETF) Request for Comment (RFC) 3344, and the associated specifications) provides for a system that may allow a mobile node (MN), such as MN 160, to move between different sub-networks without the need to tear down the established transport layer sessions.

Home agent domain 120 may include home agent (HA) 122 and a resource manager for the home agent domain (RM-HA) 124. HA 122 may include a router or another network device, and RM-HA 124 may be computing device to track resource availability with home agent domain 120. HA 122 and RM-HA 124 may be connected through a HA network 126. HA network 126 may include, for example, a local area network (LAN), a wide area network (WAN), a metropolitan area network (MAN), an intranet, the Internet, a Public Land Mobile Network (PLMN), or a telephone network, such as the Public Switched Telephone Network (PSTN), or a combination of networks. Traffic entering and leaving home agent domain 120 may pass through a border node for the home agent domain (HA-BN) 128. HA 122 may store user profile information, including service level agreement (SLA) information for particular mobile users. As used herein, an SLA may be a service contract between a customer and a service provider that specifies the quality of service a customer should receive. RM-HA 124 may set up routers (e.g., HA-BN 128) with appropriate configuration at the edge of home agent domain 120 and may support the control of resource management processes across boundaries to adjacent regions.

Correspondent domain 130 may include correspondent node (CN) 132 and a resource manager for the correspondent node domain (RM-CN) 134. CN 132 may include a router or another network device, and RM-CN 134 may be computing device to track resource availability with home agent domain 120. CN 132 and RM-CN 134 may be connected through a CN network 136. CN network 136 may include, for example, a local area network (LAN), a wide area network (WAN), a metropolitan area network (MAN), an intranet, the Internet, a Public Land Mobile Network (PLMN), or a telephone network, such as the Public Switched Telephone Network (PSTN), or a combination of networks. Traffic entering and leaving correspondent domain 130 may pass through a border node for the correspondent domain (CN-BN) 138. CN 132 may be another node with which MN 160 is communicating. RM-CN 134 may set up routers (e.g., CN-BN 138) with appropriate configuration at the edge of corresponding node domain 130 and may support the control of resource management processes across boundaries to adjacent regions.

Core network domains 140/150 may each be a network that supports aggregate traffic originated by or destined for a mobile node (such as MN 160) and/or originated by or destined for a stationary node (such as HA 122 or CN 132). In one implementation, core network domains 140/150 may use a differentiate services (DiffServ) architecture. Thus, core network domains 140/150 may serve as a differentiated domain including a set of DiffServ nodes with a well-defined boundary. In the local registration environment, a DiffServ domain may correspond to the domain served by a GFA.

Core network domains 140/150 may include one or more DiffServ (DS) boundary nodes (BN) that connect one DS domain to a node in another DS domain. As shown in FIG. 1, core network 140 may include border nodes DS-BN 142 and DS-BN 144, while core network 150 may include border nodes DS-BN 152 and DS-BN 144. DS-BN 142 may connect core network domain 140 to home agent domain 120. DS-BN 144 may connect core network domain 140 to correspondent node domain 130 and/or core network domain 150. DS-BN 152 may connect core network domain 150 to mobile domain 110. In a Mobile-IP environment, a HA (such as HA 122) and multiple foreign agents (such as FAs 112) may support the forwarding of traffic between a mobile node (such as MN 160) and a CN (such as CN 132). Accordingly, multiple core network domains may be needed in the resource allocation process. In addition to base Mobile-IP protocols, route optimization and bidirectional tunnel schemes may also be utilized.

MN 160 may refer to the unit used by an end user to communicate while on the move. MN 160 may include any type of wireless communication or computation device, such as a mobile telephone, smart phone, or personal digital assistant (PDA), that is capable of transmitting and receiving voice signals and/or data to/from a network, such as network 110. MN 160 may also refer to a unit which is capable of using both wired and wireless communication.

The mobility of the MN 160 may be supported by an HA, such as HA 122, and one or more FAs, such as FA 112-6. HA 122 may keep track of the current location of each mobile node affiliated with HA 122. Regional Registration Mobile-IP is a kind of Mobile-IP that may be characterized by a reduced registration delay. The systems and methods described herein are primarily described in the context of Mobile-IP protocol and Mobile IPv4 Regional. The systems and methods described herein may be applied to other protocols supporting either mobile or stationary devices (or both) when the environment allows for such interactions.

Network protocols to support mobility of MN 160 within network 110 may ensure appropriate forwarding for packets as MN 160 changes its network attachment point (e.g., changes from FA 112-6 to another FA 112-*x*) and/or the technology used to gain access to the network. A typical mobile user may generate and receive traffic that is composed of various traffic components, such as packetized voice, interactive video, streaming voice/video and data components. To ensure that an acceptable quality of experience is observed by the end-user at MN 160, and considering the different available applications, each of the traffic components requires the appropriate treatment per the corresponding class of service. The appropriate treatment may be required on each of the network devices along the path where the user traffic will be forwarded. For a typical mobile user, such a user at MN 160, application traffic may be carried over multiple networks. To gain access to the mobility support network, MN 160 may first use an access technology to attach to a mobility provider network, such as mobile network 110. To gain access to the different services like voice and video, one or more core networks, such as core networks 140 and 150, may need to be traversed to then access correspondent network 130 where an application server, such as correspondent node 132, resides. To support consistent appropriate QoS treatment between the end user and the application service provider, QoS policy decision scope may extend beyond the mobile network 110 to core networks 140/150.

The exemplary configuration illustrated in FIG. 1 is provided for simplicity. It should be understood that a typical network may include more or fewer components than illustrated in FIG. 1. For example, additional mobile nodes, core network domains, network devices, and/or other devices involved in routing traffic may be included in network 100.

Figure 2:
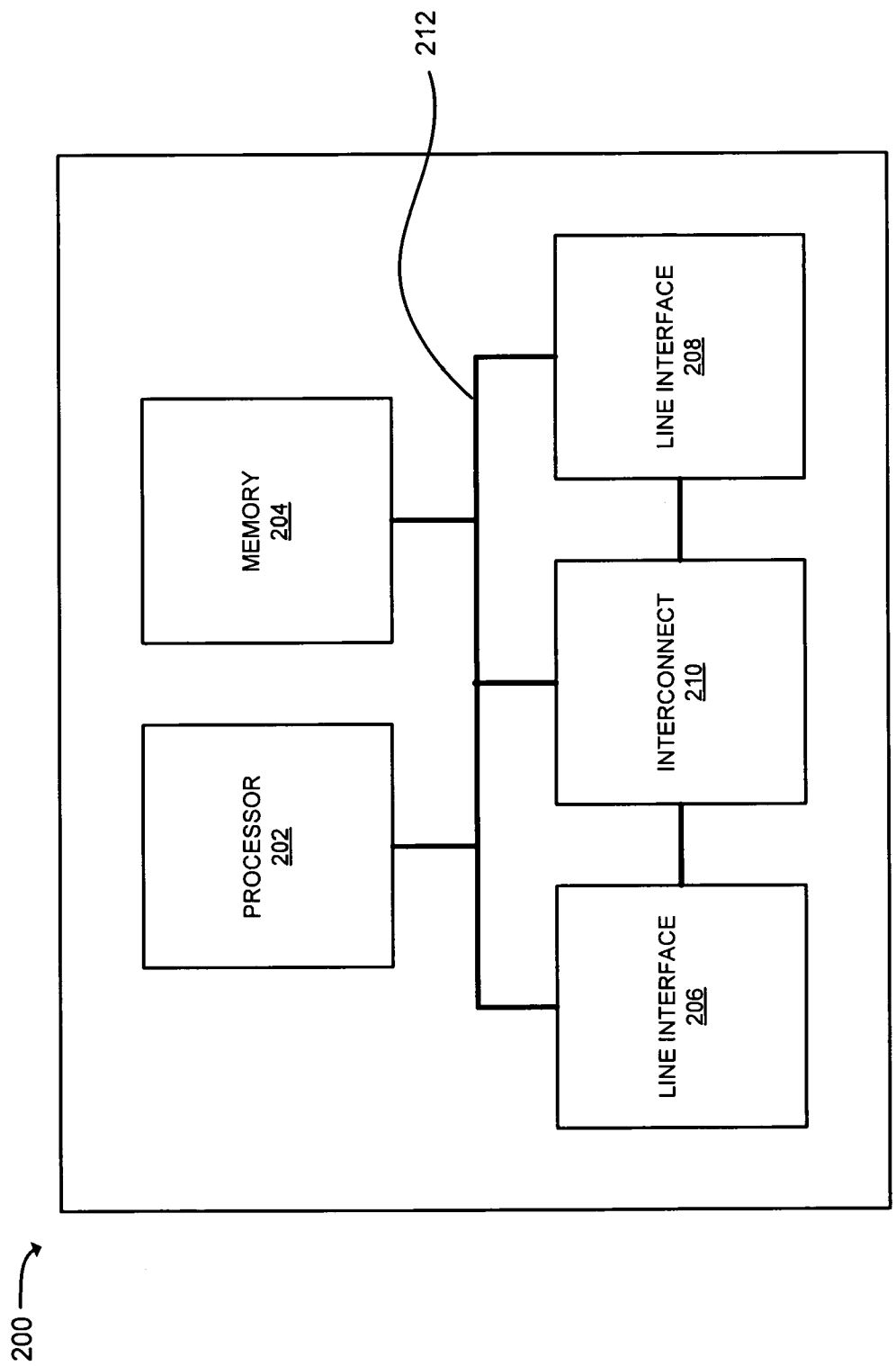
FIG. 2 illustrates an exemplary network device that may be used with the exemplary network of FIG. 1.

FIG. 2 is a block diagram of a network device 200, which may correspond to one or more of CFA-BN 118, HA-BN 128, CN-BN 138, DS-BN 142, DS-BN 144, and DS-BN 152. Network device 200 may also be included as a component in one or more of FA 112-*x*. As shown, network device 200 may include a processor 202, a memory 204, line interfaces 206-208, an interconnect 210, and communication paths 212. In different implementations, network device 200 may include additional, fewer, or different components than the ones illustrated in FIG. 2. For example, network device 200 may include additional line interfaces.

Processor 202 may include one or more processors, microprocessors, and/or processing logic optimized for networking and communications. Processor 202 may process packets and/or network path-related information.

Memory 204 may include static memory, such as read only memory (ROM), dynamic memory, such as random access memory (RAM), and/or onboard cache, for storing data and machine-readable instructions. In some implementations, memory 204 may also include other types of storage devices. In a particular implementation, memory 204 may include a database component.

Line interfaces 206 and 208 may include components for receiving incoming packets from network devices and/or nodes in network 100 and for transmitting packets to other network devices and/or nodes in network 100. Interconnect 210 may include switches for conveying a packet from line interface 206 to line interface 208, and vice versa. Examples of interconnect 210 may include a communication bus or a switch fabric. Communication paths 212 may provide an interface through which components of network device 200 can communicate with one another.

Figure 3:
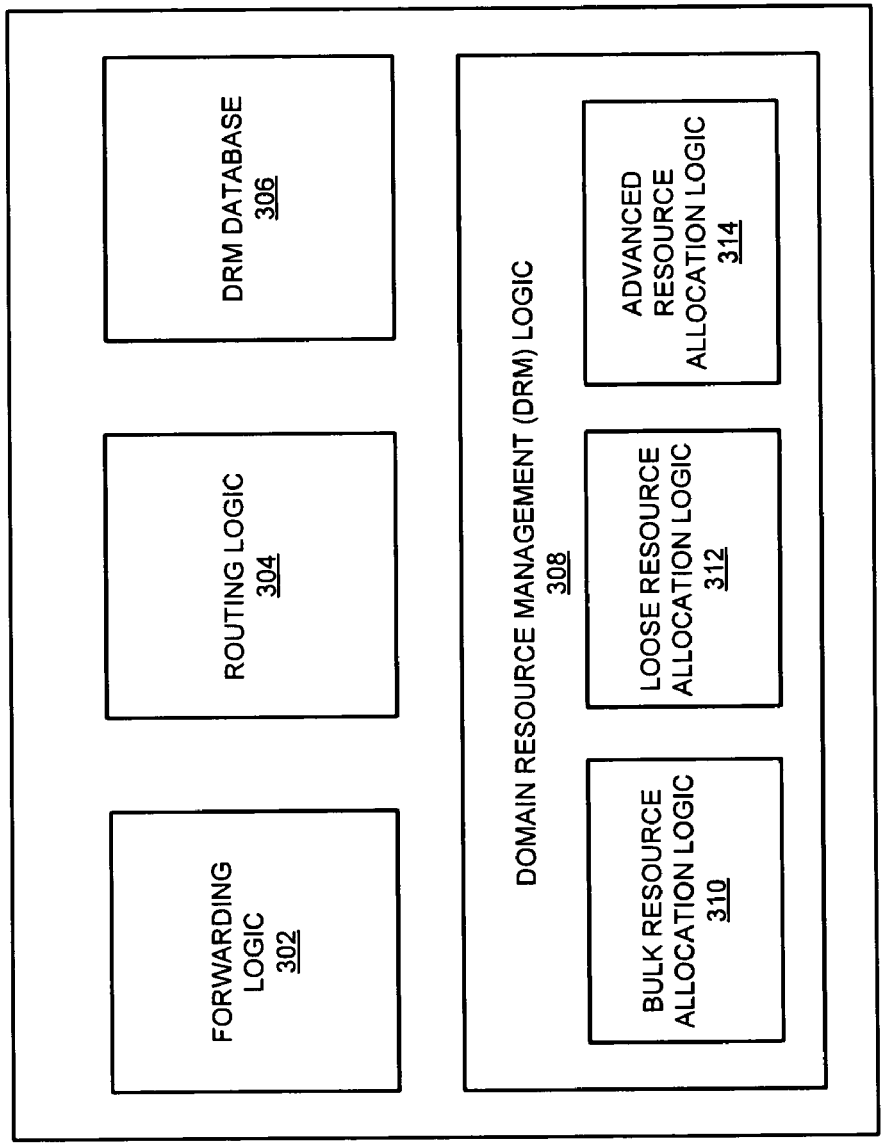
FIG. 3 is a functional block diagram of the exemplary network device of FIG. 2.

FIG. 3 is a functional block diagram of an exemplary foreign agent 112-$x$. As shown, foreign agent 112-$x$ may include forwarding logic 302, routing logic 304, DRM logic 306, and DRM database 308. Depending on the implementation, foreign agent 112-$x$ may include fewer, additional, or different components than those illustrated in FIG. 3. For example, if network device 200 is implemented as an intermediate node, foreign agent 112-$x$ may not necessarily include DRM logic 306 or DRM database 308.

Forwarding logic 302 may include hardware and/or software for routing packets toward their destination devices through network 100. In one implementation, forwarding logic 304 may perform a lookup in a forwarding table based on source and destination address information included in a header of a received data packet. In addition to forwarding the packet, forwarding logic 302 may perform various procedures on the packet header, depending on where the node is functioning within a domain (e.g., whether a node or FA is functioning as an intermediate node or an egress node for a particular domain). For example, forwarding logic 302 may convert a packet received at foreign agent 112-$x$ by adding a new header to the packet or by extending or otherwise amending the header.

Routing logic 304 may include hardware and/or software for communicating with other routers to gather and store routing information. Routing logic 304 may enforce a specific set of procedures for communicating routing messages (e.g., label distribution protocol (LDP), constraint-based routing LDP, MP-BGP, etc.) about router destinations (e.g., labels, IP addresses, etc.). Through the exchange of the routing messages, foreign agent 112-$x$ may manage routing information in foreign agent 112-$x$'s forwarding tables, by which participating network devices in network 100 may abide.

DRM logic 306 may include hardware and/or software for supporting communications from/to a mobile node, such as MN 160. As further described below, DRM logic 306 may intercept and process QoS requests triggered by MN 160 and FAs (such as FAs 112). In one implementation, DRM logic 306, in conjunction with DRM database 308, may keep track of the current available resources in the domain served by the GFA (such as GFA 112-1 of FIG. 1). In one implementation, DRM logic 306 may also keep track of resources allocated on the path to other domains. DRM logic 306 may include one or more of bulk resource allocation logic 310, loose resource allocation logic 312 and advance resource allocation logic 314. As described further herein each of bulk resource allocation logic 310, loose resource allocation logic 312 and advance resource allocation logic 314 may support particular resource allocation functions to support resource allocation for a mobile node within mobile domain, such as mobile domain 110.

DRM database 308 may be stored on one or more storage device, such as memory 204. DRM database 308 may include information regarding the physical link capacities and the current bandwidth assignment on the different links of the regional hierarchy in the DiffServ domains. DRM database may be accessed by DRM logic 308 to provide information to support resource allocation decisions. In one implementation, a domain capacity engineering profile may be created and stored in DRM database 308. The domain capacity engineering profile may include, for example, mobility patterns within the mobile domain, existing physical capacity of networks links, and business requirements. DRM database 308 may also store subscriber profiles that can be used to identify if a subscriber is entitled to request a particular service or SLA.

Figure 4:
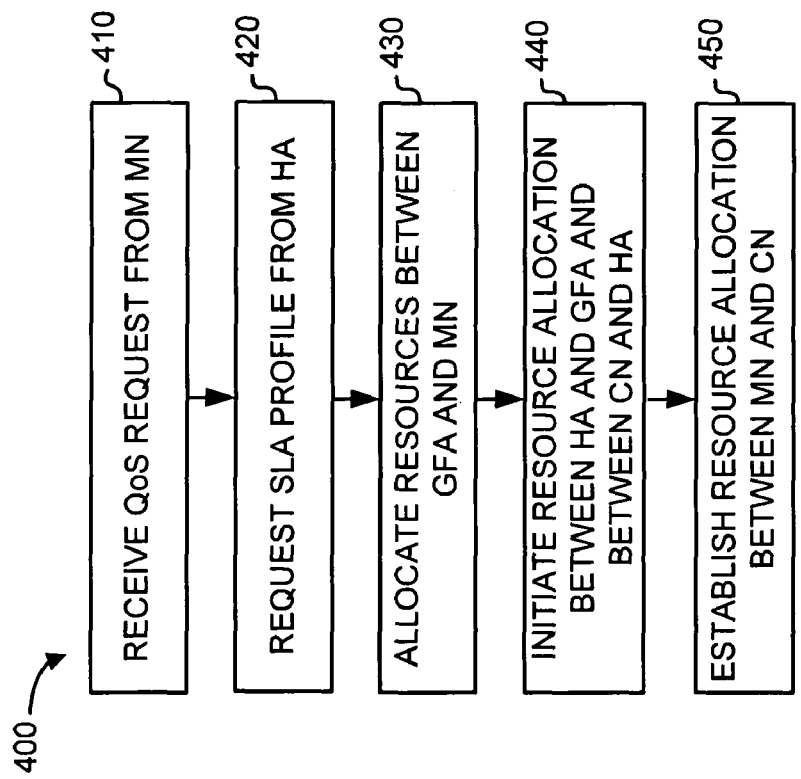
FIG. 4 is a flow diagram illustrating exemplary processing by a network device acting as domain resource manager (DRM)

FIG. 4 is a flow diagram illustrating an exemplary process 400 associated with processing QoS/resource requests in network 100. In one implementation, process 400 may be performed by a foreign agent 112-$x$, such as GFA 112-1 of FIG. 1. In another implementation, some or all of process 400 may be performed by another device or a group of devices, including or excluding GFA 112-1. Process 400 relates to resource allocation upstream relative to MN 160.

Process 400 may begin when a user at MN 160 attempts to establish a media session with a correspondent node, such as CN 132. For example, assume that MN 160 is a cellular radio telephone connected to current FA 112-6, and that a domain resource manager for the current FA (DRM-CFA) is located at GFA 112-1. The DRM-CFA may include, for example, RDM logic 306 and DRM database 308 of FIG. 3. When the DRM-CFA at GFA 112-1 receives the QoS request from MN 160, it will start the process of allocating resources along the path from CN 132 to MN 160.

The term "allocating resources" may be used herein to refer to the process by which the appropriate configuration or setting is provided on one or more network devices such that the appropriate behavior is observed. The details of such configuration are dependent on the underlying QoS architecture model. As an example, a network device may be expected to forward two types of traffic, data and video. The network device may be able to process 100 Mbps of aggregate traffic on both input and output interfaces. The network device may be required to handle two traffic patterns. The first pattern may take effect between 7:00 AM and 6:00 PM, and may be composed of 60 Mbps of data and 40 Mbps of video. The second pattern, between 6:00 PM to 7:00 AM, may switch to 20 Mbps of data and 80 Mbps of video. The varying traffic patterns can be implemented using more than one approach. One technique is to mark data traffic with a particular IP precedence value, where a higher value may indicate higher priority for data (e.g., IP precedence=0 for data, and IP precedence=4 for video). Then, ingress and egress rate limiting and queuing techniques may be used to enforce allocating the intended bandwidth for each traffic class, based on the IP precedence value.

Referring to process 400, a QoS request may be received from a mobile node (block 410). For example, when MN 160 first moves to the domain served by GFA 112-1, MN 160 may send a local registration request to the current FA (e.g., FA 112-6). When MN 160 receives a packet from a correspondent node, such as CN 132, at the start of a media session that requires QoS, MN 160 may send a receiver-initiated QoS request message. This message may contain additional information, such as the MN identification, an address for HA 122, and the intended session duration. In some implementations, the QoS request may be embedded in a local registration request, instead of dedicating a separate message for this purpose.

An SLA profile may be requested from the HA (block 420). For example, the QoS request message may cause the DRM-CFA at GFA 112-1 to request a copy of the SLA profile from HA 122. The SLA profile may be forwarded to the DRM-CFA at GFA 112-1. The acquired SLA profile may remain stored in the DRM-CFA at GFA 112-1 so that no further communication with HA 122 is needed to process future QoS requests from MN 160.

Resources between the GFA and the MN may be allocated (block 430). For example, the DRM-CFA at GFA 112-1 may verify the availability of resources from GFA 112-1 to CFA 112-6. The DRM-CFA at GFA 112-1 may store information in a database (e.g., DRM database 308), including information regarding the physical link capacities and the current bandwidth assignment on the different links of the regional hierarchy. Upon receiving and verifying resource availability, the DRM-CFA at GFA 112-1 may update the corresponding entry in the database regarding the newly allocated resources. As an example, assume that current allocations for the link FA 112-1 to FA 112-3 and the link FA 112-3 to FA 112-5 of FIG. 1 are 1.6 Mbps and 0.9 Mbps, respectively. When FA 112-5 receives a QoS request from a newly arrived MN requesting a particular priority treatment for its 0.1 Mbps ingress traffic, the allocation may be updated according to this new request. The DRM-CFA at GFA 112-1 may increase the allocation for the link FA 112-1 to FA 112-3 and the link FA 112-3 to FA 112-5 to 1.7 Mbps and 1.0 Mbps, respectively, provided that the new request will not exceed the total allocation available over those links. The database may keep track of resources for each direction individually on the different links. Additional implementations for resource allocation between the GFA and MN are discussed with respect to FIGS. 7-9.

Resource allocation between the HA and the GFA and between the CN and HA may be initiated (block 440). For example, the DRM-CFA at GFA 112-1 may forward separate QoS requests to HA 122 and CN 132. In one implementation, this may be done at the same time the DRM-CFA at GFA 112-1 is verifying the local resources in its domain in block 420. Upon receiving the QoS request from the DRM-CFA at GFA 112-1, HA 122 may forward the request to RM-HA 124. CN 132 may also receive a QoS request from the DRM-CFA at GFA 112-1 and forward the QoS request to the RM-CN 134. RM-HA 124 may allocate resources from HA 122 to GFA 112-1, while RM-CN 124 may verify resources from CN 132 to the HA domain 120. RM-CN 132 and RM-HA 134 may need to contact other RMs to complete the allocation to the respective destinations. The success or failure of the allocation on those two segments (i.e., between HA 122 and GFA 112-1 and between CN 132 and HA 122) may be compiled by the DRM-CFA at GFA 112-1.

On receiving the responses for the resource requests, the DRM-CFA at GFA 112-1 may select an action according to the Service Level Agreement (SLA) for MN 160. For example, an SLA may specify that only end-to-end resource allocation is accepted, while another MN may have an SLA such that partial allocation is still accepted. If the DRM-CFA at GFA 112-1 decides to continue with the allocation process, it may set up a profile meter on the border router in the local domain (e.g., CFA-BN 118), if applicable. RM-CN 134 and RM-HA 124 may start the allocation process also in their respective domains. When needed, the DRM-CFA at GFA 112-1 may use an underlying inter-domain signaling protocol to contact the RMs in the adjacent domains (e.g., RMs in core domains 140 and 150 (not shown)) to arrange for cross-boundaries resource allocation.

Resource allocation between the MN and the CN may be established (block 450). For example, when no reverse tunneling is being used (tunneling may be considered as a separate situation discussed further below), the data traffic from CFA 112-6 can follow an optimal route to CN 132. The DRM-CFA at GFA 112-1 may refer to its local database to verify that sufficient resources exist from CFA 132 to CFA-BN 118 (the corresponding border router on the path to CN 132). Assuming resources exist in all intermediate domains, the corresponding profile meter may be placed on CFA 112-6. Using similar steps as described in the opposite direction, the corresponding profile meter will be placed on the appropriate border nodes across the domains leading to CN network 130.

Figure 5:
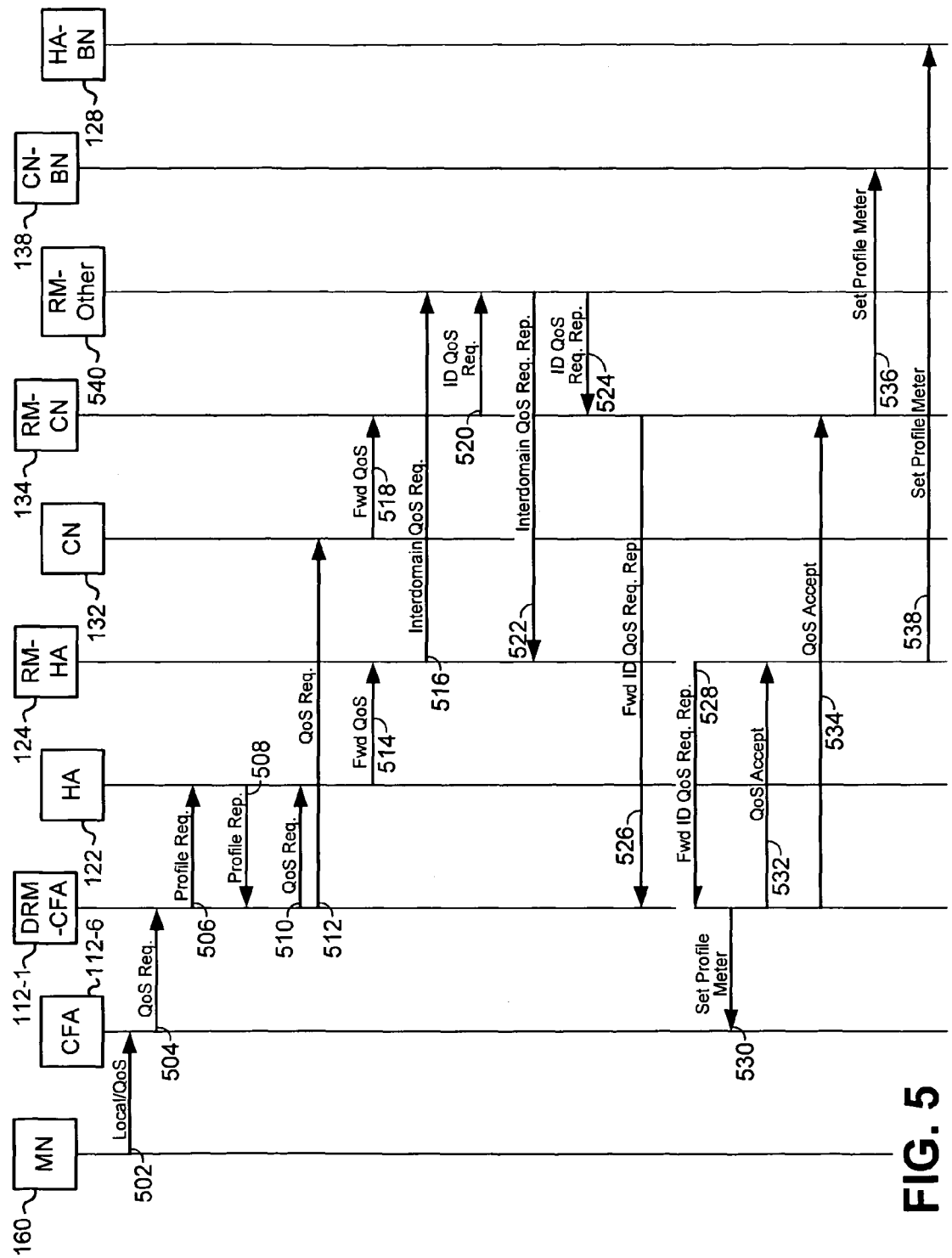
FIG. 5 is a process flow illustrating exemplary operations that may be performed by various components within a system offering hybrid network resource management.

FIG. 5 is a process flow illustrating exemplary operations that may be performed by various components within the network of FIG. 1 offering hybrid network resource management. As noted above with respect to FIG. 1, the DRM function for the current foreign agent in mobile domain 110 is co-located with GFA 112-1. Thus, with respect to FIG. 5, GFA 112-1 may also be referred to herein as DRM-CFA 112-1.

MN 160 may send a local registration to CFA 112-6 (line 502). The local registration may also include a QoS request. In another implementation, the QoS request may be sent as a separate message. CFA 112-6 may receive the QoS request and forward the QoS request (through linked FAs 112-4 and 112-3) to DRM-CFA 112-1 (line 504).

DRM-CFA 112-1 may receive the local registration and send a profile request to HA 122 (line 506). The profile request may include a request for the specific SLA profile associated with MN 160. HA 122 may provide the requested SLA profile to DRM-CFA 112-1 (line 508).

DRM-CFA 112-1 may send a QoS request to HA 122 (line 510). DRM-CFA 112-1 may also send a separate QoS request to CN 132 (line 512). HA 122 may receive the QoS request from DRM-CFA 112-1 and forward the request to RM-HA 124 (line 514). RM-HA 124 may receive the QoS request from HA 122 and, if applicable, send an interdomain QoS request to one or more other resource managers (RM-Other) 540 (line 516).

CN 132 may receive the QoS request from DRM-CFA 112-1 in line 512 and forward the QoS request to RM-CN 134 (line 518). RM-CN 134 may receive the QoS request from CN 132 and, if applicable, send an interdomain QoS request to one or more RM-Other 540 (line 520).

RM-Other 540 may receive the interdomain QoS request from RM-HA 124 and send a reply to the interdomain QoS request back to RM-HA 124 (line 522). RM-Other 540 may also receive the interdomain QoS request from RM-CN 134 and send a reply back to RM-CN 134 (line 524).

RM-CN 134 may receive the reply from RM-Other 540, which was sent in line 524, and forward the reply to DRM-CFA 112-1 (line 526). RM-HA 124 may receive the reply from RM-Other 540, which was sent in line 522, and forward the reply to DRM-CFA 112-1 (line 528).

DRM-CFA 112-1 may receive the replies provided in line 526 and line 528, and send a command signal to set a profile meter at CFA 112-6 (line 530).

DRM-CFA 112-1 may send a QoS accept message to RM-HA 124 (line 532). DRM-CFA 112-1 may also send a QoS accept message to RM-CN 134 (line 534). RM-CN 134 may receive the QoS accept message from DRM-CFA 112-1, which was sent in line 534, and send a control message to CN-BN 138 to set a profile meter (line 536). RM-HA 124 may receive the QoS accept message from DRM-CFA 112-1, which was sent in line 532, and send a control message to HA-BN 128 to set a profile meter (line 538). The profile meter may monitor real-time traffic flow and gather statistics regarding traffic flow ingress and/or egress.

Figure 6:
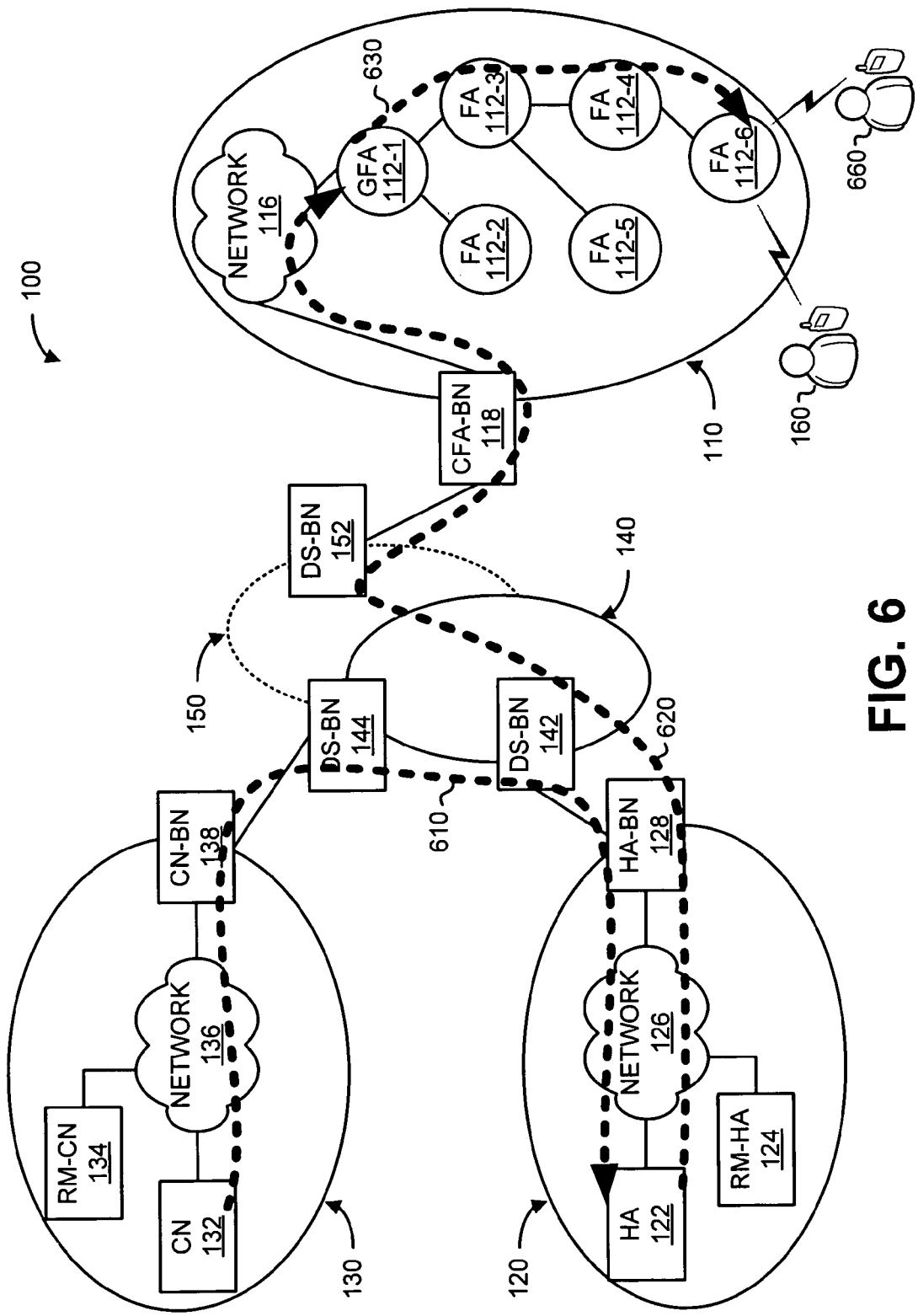
FIG. 6 illustrates an exemplary traffic path in for hybrid network resource management according to systems and methods described herein.

FIG. 6 shows exemplary forwarding paths for the exemplary network of FIG. 1. The network 100 is identical to that of FIG. 1, but a second MN 660 is included as connected to FA 112-6. Datagrams (which may include packet and/or non-packet data) in a network may be marked (e.g., with a particular precedence value or other indicator for traffic handling) as they transit through a network. A typical datagram may be marked by the datagram source, or by any of the intermediate nodes, or by a border node in the source domain while crossing different DS domains in its trip between CN 132 and MN 160. In an instance when HA 122 or CN 132 is tunneling datagrams to GFA 112-1, datagrams can be encapsulated with a new header. Several methods of encapsulation are available for use by HA 122 and the FA (e.g., GFA 112-1), and also by CN 132 when using route optimization. IP-in-IP encapsulation, minimal encapsulation, and Generic Routing Encapsulation (GRE) are examples of available schemes.

When using tunneling, information regarding the original datagram header generally may not be available for inspection in the outside header, and inspection of the internal header can lead to unacceptable effects on the performance. The encapsulation process involves adding an extra header at the entry point of the tunnel, while this header is removed at the tunnel exit point during the decapsulation process. The differentiated services code point (DSCP) values in the encapsulated/decapsulated datagram are used to ensure appropriate traffic treatment. Accordingly, the particular Mobile-IP configuration plays a role in deciding the preferred node to do marking. The effect of encapsulation on the DSCP processing is described with respect to FIG. 6.

Referring to FIG. 6, the datagram forwarding path from CN 132 to the CFA (i.e., FA 112-6) can be partitioned into three segments. A first segment 610 may be between CN 132 and HA 122. A second segment 620 may be between HA 122 and GFA 112-1. A third segment 630 may be between GFA 112-1 and FA 112-6. In the example described in FIG. 6, no tunneling takes place over CN-HA segment 610. Accordingly, CN 132 can assign an appropriate differentiated services code point (DSCP) value to the DiffServ (DS) header field for traffic over segment 610. Traffic over segment 610 will be intercepted by HA-BN 128, where the traffic may be metered and marked accordingly. On segment 620 from HA 122 to the GFA 112-1, HA 122 may tunnel the datagrams received from CN 132 to GFA 112-1. Since the tunneling process involves adding a new header to the received datagram, HA 122 can also conveniently map the DSCP value in the inner header to the same value or to a new value in the DSCP field of the external header. Segment 630, from GFA 112-1 to CFA 112-6, involves a decapsulation/re-encapsulation process at each level of the hierarchy. In some implementations, it is not necessary to implement actual decapsulation, and simple header swapping may be used instead. In the case of either actual decapsulation or header swapping, CFA 112-6 ensures that datagrams forwarded downstream have the appropriate DSCP value.

In some implementations, a MN's traffic will not be marked and processed according to its SLA until the CFA receives a control message from the DRM-CFA. The control message will set up the appropriate profile meters and markers in the mobile domain. When a MN moves to a new FA in the same local registration domain, it is highly probable that a common ancestor is one or few hops away. Accordingly, if the MN is interested in keeping the same QoS in its new location, resources need to be allocated only in the path between the common and the new FAs. The MN's traffic may not be guaranteed to be treated as contracted, until the control messages from the DRM-CFA are received by the border routers and the CFA. Holding the MN from experiencing the contracted QoS, while waiting for the DRM-CFA acceptance message, may not be efficient in this situation. Allocation schemes, including bulk resource allocations, loose allocations, and advanced allocations, may be used to provide better quality of service to the MNs. These allocation schemes are discussed below with respect to FIGS. 7, 8A, 8B and 9.

Figure 7:
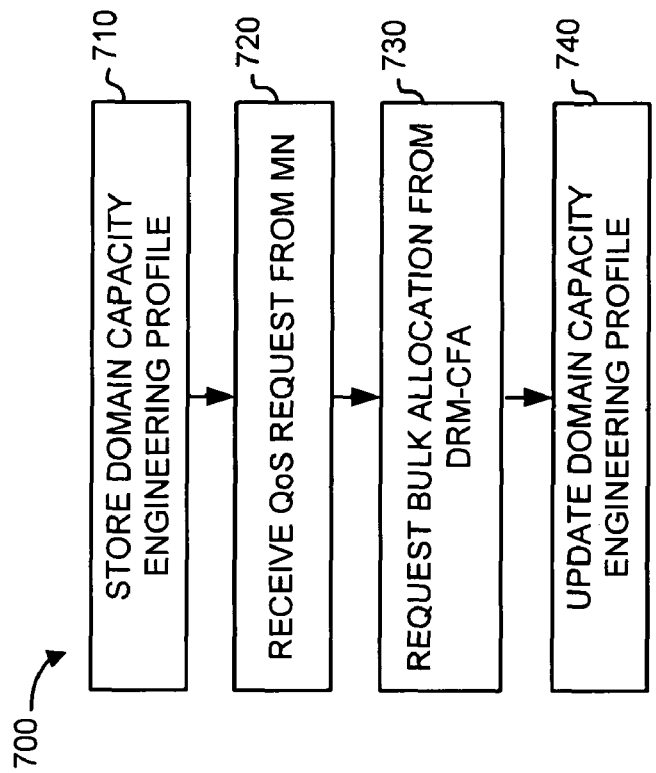
FIG. 7 is a flow diagram illustrating exemplary processing by a network device for a bulk resource allocation.

FIG. 7 is a flow diagram 700 illustrating exemplary processing by a network device for a bulk resource allocation. Bulk resource allocation may reduce the amount of signaling associated with resource requests and may provide a faster resource allocation to a mobile node upon mobility events (such as, e.g., a mobile node transitioning between foreign agents). Generally, when a FA processes a resource request, bulk resource allocation logic (e.g., bulk resource allocation logic 310 of FIG. 3) may anticipate future requests and may allocate a corresponding amount of resources.

A domain capacity engineering profile may be stored (block 710). For example, a FA (such as FA 112-*x* of FIG. 1) may store the domain capacity engineering profile in a memory (such as memory 204 of FIG. 2). The profile may be tailored in advance to accommodate for mobility patterns within the mobile domain, existing physical capacity of networks links, and various business requirements.

A QoS request from a MN may be received (block 720). For example, MN 160 may send a QoS request that is received by the CFA associated with MN 160 (e.g., CFA 112-6 of FIG. 1). The QoS request may be for a particular amount of bandwidth, such as 1 Mbps (for a particular traffic component, such as video, or for aggregate traffic associated with this MN).

A bulk allocation may be requested from the DRM-CFA (block 730). For example, the CFA (e.g., CFA 112-6) may send a bulk allocation request to the DRM-CFA at GFA 112-1 based on the domain capacity engineering profile. Thus, the amount of resources which can be requested in the allocation is not equivalent to the bandwidth requested by an individual user, such as MN 160. Instead, the CFA will consider an allocation which is dependent on the domain capacity engineering profile. For example, a FA that anticipates 20 requests for 1 Mbps allocation (over a period of time), may try to allocate this aggregate amount over two requests each of 10 Mbps.

The domain capacity engineering profile may be updated (block 740). The DRM (e.g., bulk resource allocation logic 310 of FIG. 3) may keep track of the domain capacity engineering profiles and tune configurable parameters for the domain capacity engineering profile based on collected statistics.

To illustrate the bulk resource allocation approach, consider this example. In FIG. 1, FA 112-2 has no current mobile device resources and no resources allocated upstream on the link from FA 112-2 to GFA 112-1. When a mobile device (not shown) moves to the area serviced by FA 112-2, the mobile device may send a QoS request for a 5 Mbps allocation. FA 112-2 may consult its domain capacity engineering profile, and, accordingly, may request a bulk allocation of 50 Mbps to allow FA 112-2 to service additional mobile devices. FA 112-2 will keep track of allocated bandwidth on the link from FA 112-2 to GFA 112-1. When consumed resources exceed a particular threshold, a new bulk allocation may be requested.

Figure 8A:
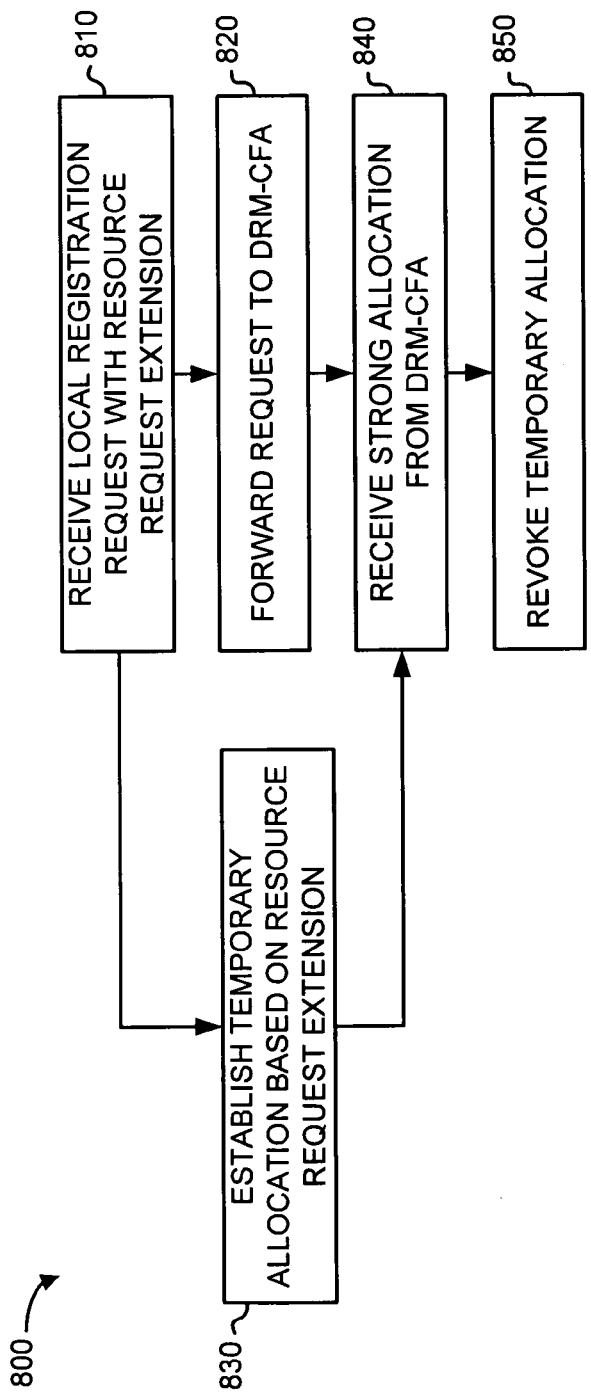
FIG. 8A is a flow diagram illustrating exemplary processing by a network device for a loose resource allocation.
Figure 8B:
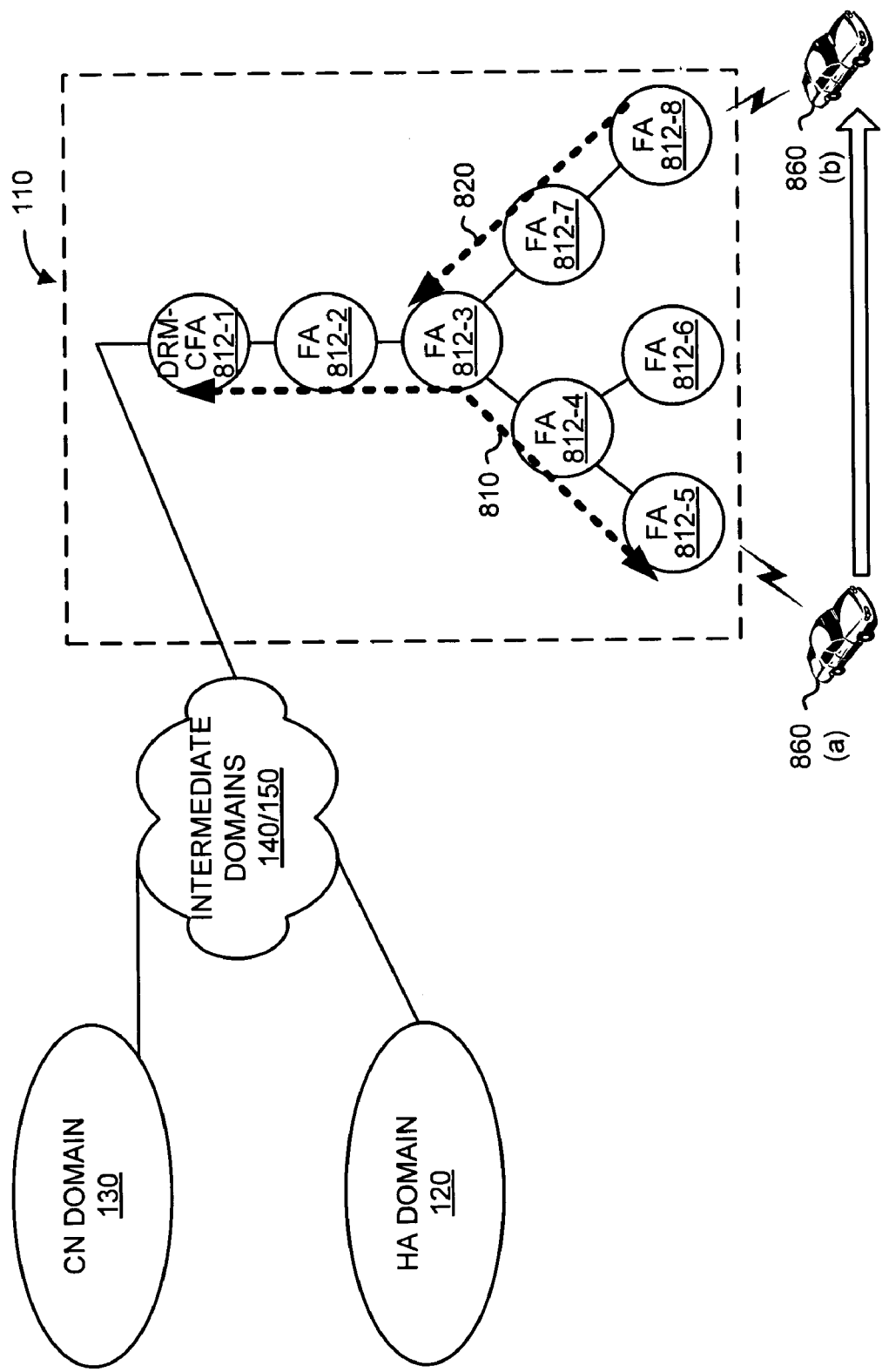
FIG. 8B illustrates exemplary resource allocation flow for an exemplary network implementing loose resource allocation.

FIG. 8A is a flow diagram 800 illustrating exemplary processing by a network device for a loose resource allocation. As used herein, the process of allocating temporary resources to a MN until the allocation request is confirmed by a DRM-CFA may be referred to as a "loose allocation." A loose allocation may allocate required resources in a fast manner on the segment of the hierarchy that is common between the previous and new lineages in a mobile domain. FIG. 8B illustrates an exemplary resource allocation flow for an exemplary network using implementing loose resource allocation (using, e.g., loose resource allocation logic 312 of FIG. 3). FIG. 8B depicts a simplified view of the exemplary network of FIG. 1 including mobile domain 110, HA domain 120, CN domain 130 and intermediate domains 140/150. Mobile domain 110 may include FAs 812-1 through 812-8, with FA 812-1 serving as the DRM-CFA. Each of FAs 812-1 through 812-8 may be equivalent to FA 112-x of FIG. 1, but are renumbered for clarity. Mobile node (MN) 860 is shown transitioning from position (a) to position (b).

Referring to FIG. 8A, a registration request including a resource request extension may be received (block 810). Loose allocation support may rely on the local registration messages and may not necessitate new messages. For example, mobile node 860 in position (a) has an established QoS with FA 812-5. As MN 860 transitions from position (a) to position (b), MN 860 may send a local registration request which can be received by FA 812-8. When sending the local registration request to the new CFA (e.g., FA 812-8), MN 860 may append the registration request with a resource request extension. The resource request extension may provide QoS requirements for MN 860.

The local registration request may be forwarded to the DRM-CFA (block 820). For example, the new CFA (FA 812-8) may intercept the resource request extension and may forward the resource request extension to the DRM-CFA (e.g., DRM-CFA 812-1) for regular processing.

A temporary allocation may be established based on the resource request extension (block 830). For example, FA 812-8 does not need to wait for a response to the resource request extension that was forwarded to DRM-CFA 812-1 in block 810. Instead, FA 812-8 may spawn another process to provide a temporary QoS allocation that matches (as resources permit) the SLA of MN 860 as described in the resource request extension that was provided with the local registration request.

A strong allocation may be received from the DRM-CFA (block 840). For example, in response to the forwarded request of block 820, DRM-CFA 812-1 may generate a command message to provide a QoS allocation for MN 860. The temporary allocation may be revoked (block 850). For example, FA 812-8 may revoke the temporary allocation for MN 860, in lieu of the strong allocation received from DRM-CFA 812-1.

Considering that new strong (in contrast with loose) allocations can be processed and accepted for other traffic during the life time of other loose allocations, traffic accepted based on a loose allocation may be marked differently from traffic with strong resource allocation. The different marking may assure that service provided to traffic associated with a strong allocation is not degraded because of a competition from the traffic with a loose allocation.

Applying the above flow diagram 800 to FIG. 8B, assume that MN 860 is residing at FA 812-5 (e.g., position (a)) and decides to communicate with a node in CN domain 130. A QoS request may be forwarded to DRM-CFA 812-1 along path 810. MN 860 may specify, for example, 20 Kbps of traffic in a bi-directional tunnel mode, with a particular service class (e.g., DSCP class 1). When MN 860 moves to FA 812-8 (e.g., position (b)), MN 860 may send a local registration request destined to FA 812-3. If loose allocation is enabled, each network device on the path 820 to FA 812-3 (i.e., FA 812-8, FA 812-7, and FA 812-3) can immediately allocate resources to satisfy the request from MN 860 without waiting for a response from DRM-CFA 812-1. The resources may be allocated in a manner such that the corresponding network device along path 820 (FA 812-8, FA 812-7, or FA 812-3) can revoke the allocation when needed. For example, if FA 812-7 egress interface facing FA 812-3 is configured with static maximum allocation of 2 Mbps for class 1, then the 20 Kbps additional request can be satisfied if current allocation is 1.5 Mbps. On receiving the registration request and the embedded resource request extension, FA 812-3 can decide to accept or deny the request. If accepted, the resources will be allocated only on a temporary basis until a strong allocation message is received from DRM-CFA 812-1.

Figure 9:
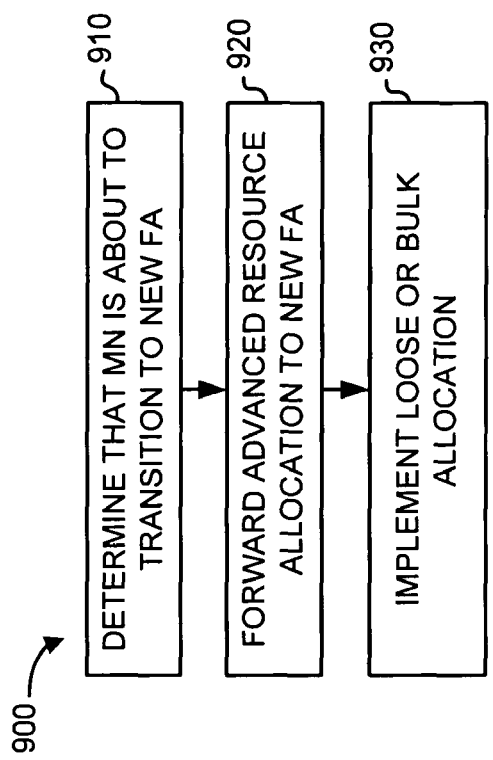
FIG. 9 is a flow diagram illustrating exemplary processing by network devices for an advanced resource allocation.

FIG. 9 is a flow diagram 900 illustrating exemplary processing by network devices for an advanced resource allocation. Generally, advance allocation utilizes predictive knowledge of the next FA that will be visited by a mobile node and initiates a resource allocation (using e.g., (e.g., advanced resource allocation logic 314 of FIG. 3) in advance of the transition. Based on configurable criteria, the next FA may be known before the mobile node leaves the previous FA.

It may be determined that the MN is about to transition to a new FA (block 910). For example, an FA (such as FA 812-5 of FIG. 8B) may identify that a MN (such as MN 860 of FIG. 8B) is approaching a transition to another FA (such as FA 812-8 of FIG. 8B).

Advanced resource allocation data may be forwarded to the new FA (block 920). For example, when it is determined that the MN (e.g., MN 860) is about to move from the current FA (e.g., FA 812-5) to the new FA (e.g., FA 812-8), either the mobile device or the previous FA (e.g., FA 812-5) may forward an advanced resource allocation request to the new FA (e.g., FA 812-8).

Loose or bulk allocation may be implemented (block 930). On receiving this request, the new FA (e.g., FA 812-8) may start an allocation process (either loose or bulk) before the MN (e.g., MN 860) actually arrives to this new service area. Thus, when the MN (e.g., MN 860) arrives to the new FA (e.g., FA 812-8), it can experience the requested quality of service immediately.

The Loose Allocation and Advanced Allocation schemes can be used individually or together to further enhance the performance and minimize the period of time that the mobile device is not allocated the requested resources. Also, in some implementations, loose and bulk allocation schemes can coexist, such that a resource management solution can use only one of the approaches or a combination of both.

As noted above, when a MN (e.g., MN 160 or MN 860) moves to a new service area, it may generate a local registration request as part of the Mobile-IP protocol. Implementations described herein may capitalize on the Mobile-IP control messages to carry resource requests and resource replies. Particularly, Mobile-IP extensions may be used for this purpose. RFC 3344 defines three distinct structures (simple, long, and short) for extension formats.

Figure 10:
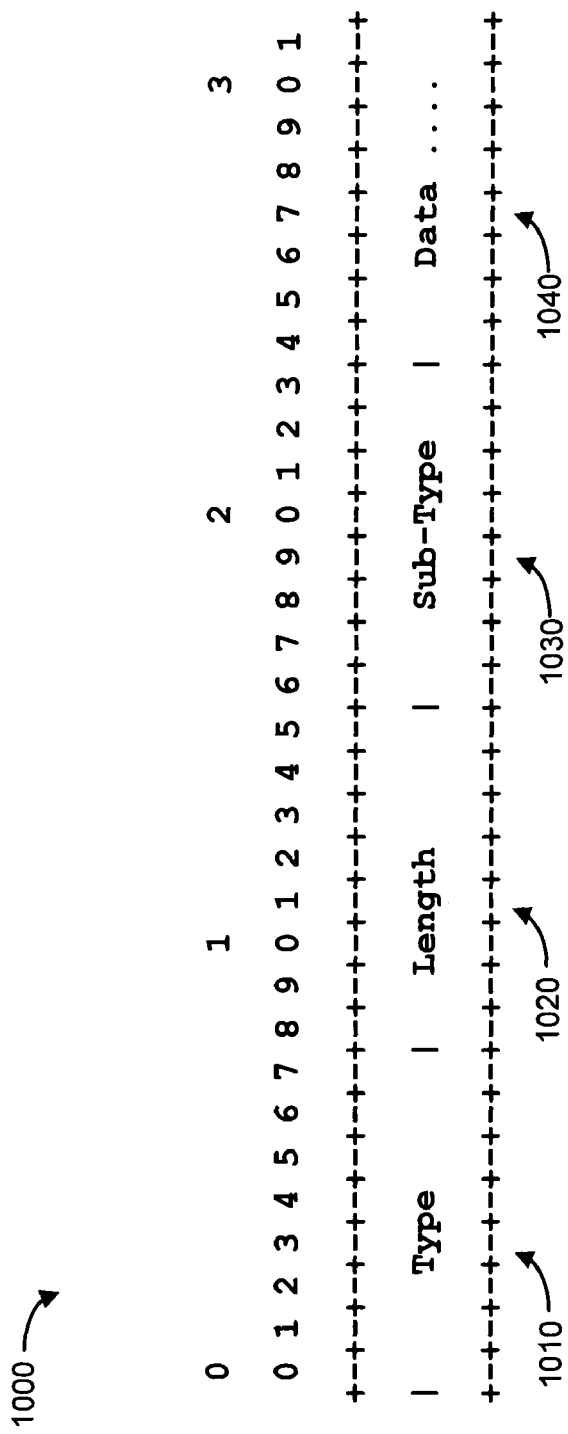
FIG. 10 illustrates an exemplary message extension that may be used in the systems and methods described herein.

FIG. 10 illustrates an exemplary short resource allocation extension 1000 to carry resource request ("Resource_Req") and resource reply ("Resource_Rep") messages. The registration request with the resource allocation extension may be sent by a MN (such as MN 160 of FIG. 1) and intercepted by a CFA (such as CFA 112-6 of FIG. 1).

Short extension 1000 may include type section 1010, length section 1020, sub-type section 1030, and data section 1040. Type section 1010 may include an identifier to indicate the message type. For example, the number "209" may be used to indicate the message is a resource allocation message. Length section 1020 may indicate the length of the extension in bytes. Sub-type 1030 may include an identifier to indicate sub-type of the message. For example, for a resource allocation message, a "1" may indicate a resource request (Resource_Req) message and a "2" may indicate a resource reply message (Resource_Reply).

Data section 1040 may include details regarding the resource request. For example, data section 1040 may include a resource request identification (1 byte). Data section 1040 may also include a requesting entity (e.g., 1 byte, such as "1" for MN or "2" for FA). A requested allocation type may also be included in data section 1040 (e.g., 1 byte, such as "1" for individual device based or "2" for aggregate). Data section 1040 may further include a requested resource direction (e.g., 1 byte, such as "1" for upstream, "2" for downstream, or "3" for both upstream and downstream). Data section 1040 may also include a resource allocation end-point (e.g., 1 byte, such as "1" for a GFA, "2" for a HA, or "3" for a CN). An address of an end-point may also be included in data section 1040 (4 bytes). Data section 1040 may further include a requested resource upstream value and a requested resource downstream value (e.g., each 4 bytes, such as a particular bits-per-section (bps) unit). Data section 1040 may also include a resource marking upstream value and a resource marking downstream value (e.g., each 1 byte, such as a differentiated services code point (DSCP) or IP precedence value). Data section 1040 may further include a resource request duration, e.g., in seconds (e.g., 4 bytes, such as "0" for release, another numerical value in seconds, or "FFFFFFFF" for infinite). Also, an allocation request mode value may be included in data section 1040 (e.g., 1 byte, such as "1" for end-to-end strict, "2" for end-to-end soft, "3" for local strict, or "4" for local soft).

Referring back to FIG. 1, exemplary activities of a FA may be used to further illustrate the systems and methods described herein. Resource allocation activities may vary depending on particular service configurations. For example, a MIP platform may specify tunneling only for incoming traffic relative to the MN. Another configuration, to accommodate (for example) firewall security rules, may require bi-directional tunneling. In some situations, QoS support may be required only in one direction between the CN and the MN. For the present example using FIG. 1, assume tunneling is required for traffic to MN 160, regular routing is used for traffic from MN 160, and QoS is required in both directions.

On receiving the registration request with the resource allocation extension from MN 160, the CFA (e.g., FA 112-6 in FIG. 1) can intercept the request and start the processing. Since, in the present example, this is the first presence of MN 160 in this hierarchical area (e.g., mobile domain 110), the registration request may travel all the way to the gateway FA, GFA 112-1. For each regional domain (e.g., mobile domain 110), a GFA (such as GFA 112-1) can act as the DRM, utilizing, for example, DRM logic 306. The DRM function can be implemented locally, or implemented on an external server. DRM logic 306 may access a database (e.g., database 308) that includes the subscriber profile that can be used to identify if a subscriber is entitled to request a particular service or SLA. While the request is traveling upstream (e.g., through FA 112-6, FA 112-4, and FA 112-3 to GFA 112-1), each corresponding FA will check its local resource allocation table to verify if the request can be accommodated. In this context, each FA may verify that its current configuration can support the intended service level after considering this new request.

Considering the tunneling arrangement of the present example, and assuming that FA 112-6 is currently not serving another MN, the CFA (i.e., FA 112-6) may verify it can support the allocation from FA 112-6 to MN 160 over the wireless link. FA 112-6 may then verify its ingress queuing configuration on the interface facing FA 112-4. In addition, FA 112-6 may update the registration request extension indicating that it can support the requested resources. On receiving the request, FA 112-4 may verify its configuration and resources and verify that it can support the allocation on the interface leading to FA 112-6.

By the time the request is intercepted by GFA 112-1 (including the DRM-CFA), local resources between GFA 112-6 and MN 160 may have been verified. Considering the nature of this request, the DRM-CFA at GFA 112-1 also may need to verify resources on segments through core network domain 150, core network domain 140, correspondent domain 130, and home agent domain 120. Each of those domains may belong to a different provider. The task of verifying resources can be accomplished in at least two ways, depending on the existing architecture.

One approach may be that each of those domains has a corresponding RM (such as RM-HA 124 for HA domain 120 and RM-CN 134 for CN domain 130). On receiving the request, the DRM-CFA at GFA 112-1 can send a resource allocation request for a path with a starting point and end point that belong to HA 122 and CFA-BN 118, respectively. The DRM-CFA at GFA 112-1 may send this request to the RM (not shown) for core domain 150. In its turn, the RM (not shown) for core domain 140 will send a request to HA domain 120. The corresponding replies may be compiled by the DRM-CFA at GFA 112-1, which can track the expected replies by verifying the allocation end points of each reply. It is possible that one or more RM (for example, an RM for core domain 140 or core domain 150) can return a negative reply. In this case, depending on the request specification, the request may be either accepted or denied. As an example, a strict resource request may not be accepted if any of the RM returns a negative response, while a soft resource request may accommodate partial allocation.

Another approach to handle resource allocation in external domains is to rely on the DRM-CFA at GFA 112-1. This approach can be used when the external domains do not support RM functions. In this case, the DRM-CFA at GFA 112-1 may keep track of pre-allocated resources between the individual domains (e.g., core domains 140 and 150) and its domain (e.g., mobile domain 110). Each hierarchical regional domain may be assigned a pre-defined allocation for the different classes (IP precedence for example).

Implementations described herein may provide systems and methods to manage resources and policies in an environment that includes multiple networks with support for user mobility. A hybrid approach may be used to collect, aggregate, and process QoS-related requests in both mobility support and core networks. To manage resources in the mobility support environment, this hybrid approach utilizes a distributed scheme that capitalizes on the mobility network characteristics to reduce the overhead associated with resource management in the highly dynamic environment. A centralized scheme is used to accommodate resource management in the core network. The hybrid scheme utilizes both the distributed and centralized management techniques to ensure optimal performance. Another hybrid aspect of the system is utilizing both soft and hard states when managing resources in the network.

The foregoing description of exemplary implementations provides illustration and description, but is not intended to be exhaustive or to limit the invention to the precise form disclosed. Modifications and variations are possible in light of the above teachings or may be acquired from practice of the invention.

For example, various features have been described above with respect to Mobile-IP protocols. As discussed above, other signaling protocols, or other IP-based signaling/protocols, may be used in other implementations. In addition, in some implementations, the functions described above as being performed by one of the components may be performed by other components. In other implementations, the functions described as being performed by multiple components may be performed by a single component. For example, in some implementations DRM functions may be included in a computing device that is not co-located with a FA.

In addition, while series of blocks have been described with respect to FIGS. 4, 7, 8A and 9, the order of the blocks may be varied in other implementations. Moreover, non-dependent blocks may be implemented in parallel.

It will be apparent that various features described above may be implemented in many different forms of software, firmware, and hardware in the implementations illustrated in the figures. The actual software code or specialized control hardware used to implement the various features is not limiting of the invention. Thus, the operation and behavior of the aspects of the invention were described without reference to the specific software code—it being understood that one would be able to design software and control hardware to implement the various features based on the description herein.

Further, certain portions of the invention may be implemented as "logic" that performs one or more functions. This logic may include firmware, hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a first network device in a first network domain, a quality of service request initiated by a first mobile node, the quality of service request being associated with transmitting data between the first mobile node and a second mobile node in a second network domain that is different from the first network domain;
   requesting, by the first network device and from a second network device in a third network domain, a service level agreement profile for the first mobile node,
   the service level agreement profile specifying a particular quality of service associated with the first mobile node, and
   the third network domain being different from the first network domain and the second network domain;
   determining, by the first network device, an availability of resources between the first network device and the first mobile node;
   allocating, by the first network device, resources between the first network device and the first mobile node based on the determined availability;
   initiating, by the first network device, a first resource allocation between the second network device and the first network device based on the service level agreement profile;
   initiating, by the first network device, a second resource allocation between the second mobile node and the second network device based on the service level agreement profile;
   establishing, by the first network device, a third resource allocation between the first mobile node and the second mobile node, based on initiating the first resource allocation and the second resource allocation; and
   processing, by the first network device, subsequent quality of service requests, from the first mobile node, based on the service level agreement profile.

2. The method of claim 1, the method further comprising:
   receiving a local registration request from the first mobile node, where the quality of service request is embedded in the local registration request.

3. The method of claim 1, further comprising:
   tracking, by first network device, current available resources within the first network domain,
   where the availability of the resources between the first network device and the first mobile node is determined based on tracking the current available resources.

4. The method of claim 3, where allocating the resources between the first network device and the first mobile node comprises:
   allocating temporary resources for the first mobile node,
   confirming, based on tracking the current available resources, an allocation request associated with allocating the resources between the first network device and the first mobile node, where allocating the temporary resources for the first mobile node provides resources within the first network domain to the first mobile node during a period defined by receiving the quality of service request and confirming the allocation request.

5. The method of claim 1, further comprising:
   tracking available resources within the first network domain and available resources allocated on a path to other network domains, where the other network domains include the second network domain and the third network domain, and
   where establishing the resource allocation is further based on the tracking.

6. The method of claim 3, where allocating the resources between the first network device and the first mobile node comprises:
   receiving a bulk allocation request from a third network device included in the first network domain,
   where the bulk allocation request requests resources associated with transmitting the data between the first mobile node and the second mobile node and resources associated with anticipated requests from other mobile nodes, where the third network device anticipates the requests from the other mobile nodes based on the first network device tracking the current available resources, and where the first mobile node accesses the first network domain via the third network device, and providing a bulk resource allocation command message to provide an initial allocation of resources to the third network device based on the bulk allocation request.

7. The method of claim 1, where allocating resources between the first network device and the first mobile node establishes the quality of service between the first mobile node and a third network device included in the first network domain, the method further comprising:

forwarding resource allocation data to a next network device, included in the first network domain, predicted to be accessed by the first mobile node as the first mobile node travels through the first network domain.

8. A system comprising:
one or more devices to:
provide a network attachment point for a mobile node to a first mobile domain, and receive a quality of service request from the mobile node, the quality of service request being associated with transmitting data between the first mobile node and a second mobile node that is located in a second mobile domain that is different from the first mobile domain, request, based on the quality of service request, a service level agreement profile associated with the first mobile node from a device associated with a third mobile domain that is different from the first mobile domain and the second mobile domain, the service level agreement profile specifying a particular quality of service associated with the first mobile node, determine an availability of resources between the first mobile node and the one or more devices, allocate resources between the first mobile node and the one or more devices based on the determined availability, initiate, based on the service level agreement profile, a first resource allocation between the one or more devices and the device associated with the third mobile domain and a second resource allocation between the second mobile node and the device associated with the third mobile domain, establish, based on initiating the first resource allocation and the second resource allocation, a third resource allocation between the first mobile node and the second mobile node, and process, based on the service level agreement profile, subsequent quality of service requests from the first mobile node.

9. The system of claim 8, where the one or more devices are further to:

track resources allocated within the first mobile domain, and determine the availability of the resources based on the tracking.

10. The system of claim 8, where the one or more devices comprise:

a memory that includes information identifying physical link capacities and current bandwidth assignments on links of the first mobile domain, and where the availability of the resources is determined based on the information identifying the physical link capacities and the current bandwidth assignments.

11. The system of claim 8, where, when allocating the resources, the one or more devices are further to:

generate a bulk allocation request to request a particular amount of bandwidth based on the determined availability and the quality of service request.

12. The system of claim 8, where, when allocating the resources, the one or more devices are further to:

allocate initial resources to the first mobile node, transmit an allocation request, associated with the quality of service request after allocating the resources to the first mobile node, receive a response to the allocation request, and confirm the allocation of the initial resources based on the response.

13. The system of claim 8, where the one or more devices are further to:

forward resource allocation data to a network device within the first mobile domain based on a movement of the first mobile node within the first mobile domain.

14. A method, comprising:

receiving, by a first network device, a quality of service (QoS) request initiated by a first mobile communication device entering into a first network, the QoS request being associated with a transmission of data between the first mobile communication device and a second mobile communication device;

forwarding, by the network device, the QoS request to a second network device associated with a home network of the first mobile communication device and a third network device associated with a second network associated with the second mobile communication device;

receiving, by the first network device and from the second network device, information identifying a quality of service to be provided to the first mobile communication device based on forwarding the QoS request;

setting a profile meter to monitor traffic flow between the first mobile communication device and the second mobile communication device based on receiving the information identifying the quality of service to be provided to the first mobile device; and monitoring, by the first network device, traffic flow between the first mobile communication device and the second mobile communication device based on setting the profile meter.

15. The method of claim 14, further comprising:

sending a service profile request for the first mobile communication device to the second network device; and receiving and storing a service profile for the first mobile communication device, where the service profile is received from the second network device based on sending the service profile request and the service profile includes the information identifying the quality of service to be provided to the first mobile communication device.

16. The method of claim 14, further comprising:

receiving a QoS reply from the first network device and a QoS reply from the second network device; and establishing an allocation of resources associated with the transmission of the data between the first mobile communication device and the second mobile communication device based on receiving the QoS reply from the first network device and the QoS reply from the second network device.

17. The method of claim 14, where the QoS request is embedded in a local registration request from the first mobile communication device.

18. A non-transitory computer-readable memory storing instructions, the computer-readable memory comprising:
one or more instructions which, when executed by one or more network devices, cause the one or more network devices to receive a quality of service request initiated by a first mobile device, the quality of service request being associated with a transmission of data between the first mobile device and a second mobile device that is located in a second mobile domain, the second mobile domain being different from the first mobile domain;
one or more instructions which, when executed by the one or more network devices, cause the one or more network devices to request, based on the quality of service request, a service level agreement profile associated with the first mobile device from a network device associated with a third mobile domain, the third mobile domain being different from the first mobile domain and the second mobile domain,
the service level agreement profile specifying a particular quality of service associated with the first mobile device;
one or more instructions which, when executed by the one or more network devices, cause the one or more network devices to determine an availability of resources between the one or more network devices and the first mobile device;
one or more instructions which, when executed by the one or more network devices, cause the one or more network devices to allocate resources between the one or more network devices and the first mobile device, the resources being allocated based on the determined availability;
one or more instructions which, when executed by the one or more network devices, cause the one or more network devices to initiate, based on the service level agreement profile, a first resource allocation between the one or more network devices and the network device associated with the third mobile domain;
one or more instructions which, when executed by the one or more network devices, cause the one or more network devices to initiate a second resource allocation between the second mobile device and the network device associated with the third mobile domain;
one or more instructions which, when executed by the one or more network devices, cause the one or more network devices to store information associated with the first resource allocation and information associated with the second resource allocation;
one or more instructions which, when executed by the one or more network devices, cause the one or more network devices to establish, based on initiating the first resource allocation and the second resource allocation, a third resource allocation between the first mobile node and the second mobile node; and
one or more instructions which, when executed by the one or more network devices, cause the one or more network devices to process, using on the stored information associated with the first resource allocation and the stored information associated with the second resource allocation, subsequent quality of service requests from the first mobile device.

19. The computer-readable memory of claim 18, further comprising:
one or more instructions to forward resource allocation data to a device within the first mobile domain based on a movement of the first mobile device.

20. A system comprising:
a first device comprising:
means for intercepting a quality of service request embedded in a local registration request, the quality of service request being associated with transmitting data between a first mobile device that is associated with a first mobile domain and a second mobile device that is associated with a second mobile domain that is different from the first mobile domain;
means for requesting, based on the quality of service request, a service level agreement profile associated with the first mobile device from a second device associated with a third mobile domain that is different from the first mobile domain and the second mobile domain, the service level agreement profile specifying a particular quality of service associated with the first mobile device;
means for allocating resources between the first device and the first mobile device based on the quality of service request and an availability of resources within the first mobile domain;
means for initiating, based on the service level profile agreement, a first resource allocation between the first device and the second device and a second resource allocation between the second mobile device and the second device; and
means for establishing a third resource allocation between the first mobile device and the second mobile device, based on initiating the first resource allocation and the second resource allocation.

21. The system of claim 20, where the first device further comprises:
means for forwarding resource allocation data to a third device that is associated with the first mobile domain based on the quality of service request and a movement of the first mobile device within the first mobile domain.

* * * * *